(12) United States Patent
Morisawa et al.

(10) Patent No.: US 12,544,487 B2
(45) Date of Patent: Feb. 10, 2026

(54) SUBCUTANEOUS OR SUBMUCOSAL EXPANSION AGENT

(71) Applicants: DKS Co. Ltd., Kyoto (JP); Toshiyuki Morisawa, Nishinomiya (JP)

(72) Inventors: Toshiyuki Morisawa, Nishinomiya (JP); Takayuki Hayashi, Kyoto (JP); Yosuke Goi, Kyoto (JP); Takazumi Tawa, Kyoto (JP)

(73) Assignees: DKS CO. LTD., Kyoto (JP); Toshiyuki Morisawa, Nishinomiya (JP)

( * ) Notice: Subject to any disclaimer, the term of this patent is extended or adjusted under 35 U.S.C. 154(b) by 768 days.

(21) Appl. No.: 17/434,961

(22) PCT Filed: Mar. 2, 2020

(86) PCT No.: PCT/JP2020/008596
§ 371 (c)(1),
(2) Date: Aug. 30, 2021

(87) PCT Pub. No.: WO2020/179723
PCT Pub. Date: Sep. 10, 2020

(65) Prior Publication Data
US 2022/0160933 A1 May 26, 2022

(30) Foreign Application Priority Data
Mar. 5, 2019 (JP) ................. 2019-039431

(51) Int. Cl.
*A61L 27/20* (2006.01)
(52) U.S. Cl.
CPC .......... *A61L 27/20* (2013.01); *A61L 2400/06* (2013.01); *A61L 2430/34* (2013.01)
(58) Field of Classification Search
CPC .. A61L 27/20; A61L 2400/00; A61L 2430/34; A61L 31/042; C08L 1/02
USPC ........................................................ 514/57
See application file for complete search history.

(56) References Cited

U.S. PATENT DOCUMENTS

| 4,157,085 | A | 6/1979 | Austad |
| 10,017,583 | B2 * | 7/2018 | Varma ................. A61K 31/717 |
| 2003/0105061 | A1 | 6/2003 | Ishikawa et al. |
| 2004/0005350 | A1 | 1/2004 | Looney et al. |
| 2007/0184087 | A1 * | 8/2007 | Voigts .................... A61K 47/10 514/57 |
| 2009/0143331 | A1 | 6/2009 | Stroumpoulis et al. |
| 2019/0015550 | A1 * | 1/2019 | Lee .......... A61L 27/52 |

FOREIGN PATENT DOCUMENTS

| CN | 100467071 C | 3/2009 | |
| JP | 54-131394 A | 10/1979 | |
| JP | 2007-130508 A | 5/2007 | |
| JP | 2009-530440 A | 8/2009 | |
| JP | 2011-505362 A | 2/2011 | |
| JP | 5843313 B2 | 11/2015 | |
| WO | WO 2007/106251 A1 | 9/2007 | |
| WO | WO 2016/102767 A1 * | 6/2016 | ............... C08L 1/02 |
| WO | WO 2018/109282 A1 | 6/2018 | |

OTHER PUBLICATIONS

International Search Report for PCT/JP2020/008596 mailed on May 19, 2020.
Jiang et al., "Preparation, characterization and feasibility study of dialdehyde carboxymethyl cellulose as a novel crosslinking reagent", Carbohydrate Polymers, Nov. 9, 2015, vol. 137, pp. 632-641.
Written Opinion of the International Searching Authority for PCT/JP2020/008596 (PCT/ISA/237) mailed on May 19, 2020.
Extended European Patent Search Report dated Oct. 19, 2022 for European Patent Application No. 20766095.2.
Hikichi et al., "Novel Injection Technique: endoscopic Submucosal Dissection by Submucosal Injection of sodium carboxymethylcellulose for Early gastric cancer", Gastrointestinal Endoscopy, vol. 75, No. 4S, 2012.
Yamasaki et al., "A novel method of endoscopic submucosal dissection with blunt abrasion by submucosal injection of sodium carboxymethylcellulose: an animal preliminary study", Gastrointestinal Endoscopy, vol. 64, No. 6, 2006, pp. 958-965.

* cited by examiner

*Primary Examiner* — Ganapathy Krishnan
(74) *Attorney, Agent, or Firm* — Birch, Stewart, Kolasch & Birch, LLP (57) ABSTRACT

An object is to provide a subcutaneous or submucosal expansion agent that not only has superior expansion properties to those of conventional agents, and maintains the expanded state for a relatively long period of time, but also ensures sufficient administration properties. The subcutaneous or submucosal expansion agent is injected into a subcutaneous or submucosal space to expand the subcutaneous or submucosal space, and comprises cellulose fibers (A) containing anionically modified cellulose, and water (B).

10 Claims, 2 Drawing Sheets

* p<0.001 comparison with physiological saline
** p<0.001 comparison with MucoUp®

Fig. 4

SUBCUTANEOUS OR SUBMUCOSAL EXPANSION AGENT

TECHNICAL FIELD

The present invention relates to a subcutaneous or submucosal expansion agent.

BACKGROUND ART

Minimally invasive endoscopic mucosal resection (hereinafter abbreviated as "EMR") and endoscopic submucosal dissection (hereinafter abbreviated as "ESD") have become the first choice in surgery as the treatment of gastrointestinal polyps and cancer, with the advancement of endoscopic techniques.

When EMR or ESD is performed, saline or a hyaluronic acid-containing injection is injected into the submucosa, including the lesion, through a needle for local injection (hereinafter also referred to as a "local injection needle") to swell and raise the mucosa below the lesion. The elevated area is then resected and dissected with a radiofrequency treatment device (see PTL 1).

Substances to be submucosally injected are required to have a high level of safety, high transparency, excellent mucosal swelling ability, a long-lasting elevation-maintaining effect, low medical costs, etc.

Further, for example, in cosmetic surgery and aesthetic plastic surgery, such as skin wrinkle removal (stretching), injections containing hyaluronic acid are injected subcutaneously through a local injection needle to expand the subcutaneous tissue, and this expansion causes the skin to become taut and wrinkle-free (see PTL 2).

In these procedures, a hyaluronic acid-containing injection filled in an injection syringe is injected subcutaneously through an injection needle as thin as 0.5 mm or less.

CITATION LIST

Patent Literature

PTL 1: JP2007-130508A
PTL 2: JP2011-505362A

SUMMARY OF INVENTION

Technical Problem

However, the expansion agents containing hyaluronic acid shown in PTL 1 and PTL 2 are not sufficiently excellent in expansion properties for subcutaneous or submucosal expansion and duration of the expanded state. The relatively high medical costs have also been identified as a problem.

In addition, such an expansion agent containing hyaluronic acid must be injected with high pressure through a thin injection needle as described above, which is not excellent in terms of administration properties.

On the other hand, if the concentration of hyaluronic acid is reduced to lower the viscosity of the expansion agent containing hyaluronic acid in order to reduce the pressure during administration, subcutaneous or submucosal expansion properties may be reduced, and the expanded state may not be maintained for a sufficiently long period of time.

In view of the above circumstances, an object of the present invention is to provide a subcutaneous or submucosal expansion agent that not only has superior expansion properties to those of conventional agents, and maintains the expanded state for a relatively long period of time, but also ensures sufficient administration properties.

Solution to Problem

The subcutaneous or submucosal expansion agent according to the present invention is injected into a subcutaneous or submucosal space to expand the subcutaneous or submucosal space, and comprises cellulose fibers (A) containing anionically modified cellulose, and water (B).

The aqueous dispersion in which cellulose fibers (A) are dispersed in water (B) has a gel-like foam with a higher viscosity than that of an aqueous solution of hyaluronic acid when the shear force is small. However, when the shear force is large, the viscosity is reduced to the same level as that of the aqueous solution of hyaluronic acid, and the fluidity is increased.

Thus, the aqueous dispersion of cellulose fibers (A) has a high viscosity and excellent thixotropic properties.

Accordingly, when the expansion agent is injected subcutaneously or submucosally through a local injection needle, the same level of pressure as a hyaluronic acid-containing expansion agent is required (less resistance), in spite of its higher viscosity than that of the hyaluronic acid-containing expansion agent. Thus, sufficient administration properties can be ensured.

Therefore, the expansion agent comprising cellulose fibers (A) and water (B) not only has superior expansion properties to those of conventional agents, and maintains the expanded state for a relatively long period of time, but also ensures sufficient administration properties.

In the subcutaneous or submucosal expansion agent with the above configuration, cellulose fibers (A) may contain a carboxyl group as an anion group.

According to this configuration, due to the presence of a carboxyl group as an anion group in cellulose fibers (A), cellulose fibers (A) can be pulverized, so that cellulose fibers (A) are more uniformly dispersed in the expansion agent. Therefore, the bias in expansion properties in the expansion agent is suppressed.

In the subcutaneous or submucosal expansion agent with the above configuration, the cellulose may be oxidized in the presence of an N-oxyl compound using a cooxidant.

According to this configuration, due to the presence of cellulose anionically modified by an oxidation method using an N-oxyl compound as a catalyst and using a cooxidant in cellulose fibers (A), cellulose fibers (A) can be pulverized, so that cellulose fibers (A) are more uniformly dispersed in the expansion agent. Therefore, the bias in expansion properties in the expansion agent is suppressed.

In the subcutaneous or submucosal expansion agent with the above configuration, cellulose fibers (A) may be obtained from softwood-derived kraft pulp.

According to this configuration, cellulose fibers (A) obtained from softwood-derived kraft pulp have the property of being easily pulverized. Thus, an expansion agent with a relatively high viscosity in which cellulose fibers (A) are more uniformly dispersed can be obtained. Therefore, the viscosity of the expansion agent can be improved, and more excellent expansion properties can be achieved.

Advantageous Effects of Invention

As described above, the present invention provides a subcutaneous or submucosal expansion agent that not only has superior expansion properties to those of conventional agents, and maintains the expanded state for a relatively long period of time, but also ensures sufficient administration properties.

DESCRIPTION OF EMBODIMENTS

An embodiment of the present invention is described below.

The subcutaneous or submucosal expansion agent (hereinafter also simply referred to as "the expansion agent") of the present embodiment is injected into a subcutaneous or submucosal space to expand the subcutaneous or submucosal space, and comprises cellulose fibers (A) containing anionically modified cellulose, and water (B).

Cellulose fibers (A) containing anionically modified cellulose are formed from anionically modified cellulose. The anionically modified cellulose is not particularly limited, as long as it is cellulose having an anion group. The cellulose is preferably cellulose nitrate, sulfated cellulose, phosphorylated cellulose, carboxymethyl cellulose, or the like. It is most preferable to contain a carboxyl group anionically modified by an oxidation method using an N-oxyl compound as a catalyst. That is, it is most preferable that cellulose fibers (A) contain an anionically modified carboxyl group oxidized using a cooxidant in the presence of an N-oxyl compound.

Thus, cellulose fibers (A) containing cellulose containing a carboxyl group anionically modified by an oxidation method using an N-oxyl compound as a catalyst are, for example, cellulose fibers having a number average fiber diameter of 2 to 150 nm and having a cellulose type I crystal structure, wherein the C6 position of each glucose unit in the cellulose molecules is selectively assigned to an aldehyde, ketone, or carboxyl group, and the carboxyl group content is 1.2 to 2.5 mmol/g, the total content of aldehyde and ketone groups measured by a semicarbazide method is 0.3 mmol/g or less, and no aldehyde groups are detected with a Fehling reagent. The cellulose has at least a carboxyl group, and may have at least one of aldehyde and ketone groups in addition to the carboxyl group.

Cellulose fibers (A) containing anionically modified cellulose are fibers formed by surface oxidation of a naturally occurring cellulose solid raw material having a type I crystal structure, followed by pulverization.

That is, in the biosynthesis process of natural cellulose, nanofibers called microfibrils are almost always formed first, and they are bundled to form a higher-order solid structure. In order to weaken the inter-surface hydrogen bonds, which are responsible for the strong cohesion between the microfibrils, some of the hydroxyl groups (hydroxyl group at the C6 position of each glucose unit in the cellulose molecules) are oxidized and converted to carboxyl, aldehyde, or ketone groups.

The type I crystal structure of the anionically modified cellulose, which constitutes cellulose fibers (A), is identified, for example, by the detection of typical peaks at two positions around $2\theta=14$ to $17°$ and around $2\theta=22$ to $23°$ in the diffraction profile obtained by wide-angle X-ray diffraction image measurement.

The number average fiber diameter of cellulose fibers (A) containing anionically modified cellulose is required to be within the range of 2 to 150 nm. In terms of dispersion stability, the number average fiber diameter is preferably 2 to 100 nm, and particularly preferably 3 to 80 nm. If the number average fiber diameter is too small, cellulose fibers (A) are essentially dissolved in the dispersion medium. If the number average fiber diameter is too large, cellulose fibers (A) settle, and functionality due to mixing of cellulose fibers (A) cannot be achieved.

The maximum fiber diameter of cellulose fibers (A) containing anionically modified cellulose is preferably 1000 nm or less, and particularly preferably 500 nm or less. If the maximum fiber diameter of cellulose fibers (A) is too large, cellulose fibers (A) settle, and the functional expression of cellulose fibers (A) tends to be reduced.

The number average fiber diameter and maximum fiber diameter of cellulose fibers (A) containing anionically modified cellulose are values measured in the following manner.

Specifically, an aqueous dispersion of cellulose fibers (A) having a solid content concentration of 0.05 to 0.1 mass % is prepared, and the aqueous dispersion is cast on a hydrophilized carbon film-coated grid to obtain a sample for transmission electron microscope (TEM) observation. When fibers having a large fiber diameter are contained, scanning electron microscopy (SEM) images of the surface cast on glass may be observed. Then, observation is performed using electron micrographs taken at 5,000×, 10,000×, 50,000×, or 100,000× magnification depending on the size of the constituent fibers. At that time, axes having any vertical and horizontal image width are assumed in the obtained images, and the sample and observation conditions (magnification, etc.) are adjusted so that 20 or more fibers intersect the axes. After obtaining observation images that satisfy these conditions, two random vertical and horizontal axes are drawn per image on the images, and the fiber diameter of the fibers intersecting the axes is visually read off. In this way, a minimum of three non-overlapping images of the surface area are taken with an electron microscope, and the fiber diameter values of the fibers intersecting each of the two axes are read off (thus giving a minimum of 20 fibers×2×3=120 fiber diameter data). The number average fiber diameter and maximum fiber diameter are calculated from the fiber diameter data obtained in this manner.

In cellulose fibers (A) containing anionically modified cellulose, the cellulose is such that at least some of the hydroxyl groups at the C6 position of each glucose unit in the cellulose molecules are selectively oxidized to aldehyde, ketone, or carboxyl groups.

The content of carboxyl groups (carboxyl group content) is within the range of 1.2 to 2.5 mmol/g, and preferably within the range of 1.5 to 2.0 mmol/g.

If the carboxyl group content is too small, settlement or aggregation of cellulose fibers (A) may occur. If the carboxyl group content is too large, the water solubility may become too high.

In contrast, the carboxyl group content within the range of 1.2 to 2.5 mmol/g can inhibit the settlement and aggregation of cellulose fibers (A) and prevent the water solubility from becoming too high.

The carboxyl group content of cellulose fibers (A) containing anionically modified cellulose is measured, for example, by dispersing cellulose fibers weighed as dry mass in water to prepare 60 mL of 0.4 to 1 mass % slurry, adjusting the pH to about 2.5 using a 0.1 M hydrochloric acid aqueous solution, then adding dropwise a 0.05 M sodium hydroxide aqueous solution, and measuring the electrical conductivity. The measurement is continued until the pH reaches about 11. From the amount of sodium hydroxide (V) consumed in the neutralization stage of a weak acid with a gradual change in electrical conductivity, the carboxyl group content can be determined according to the following formula (1):

$$\text{Carboxyl group content (mmol/g)} = V \text{ (mL)} \times [0.05/\text{cellulose mass (g)}] \quad (1)$$

The carboxyl group content can be adjusted by controlling the amount of the cooxidant used in the oxidation step of cellulose fibers (A) and the reaction time, as described later.

Cellulose fibers (A) containing anionically modified cellulose are preferably reduced by a reducing agent after the above oxidative modification. As a result, some or all of the aldehyde and ketone groups are reduced back to hydroxyl groups. Carboxyl groups are generally not reduced. By the above reduction, the total content of aldehyde and ketone groups in cellulose fibers (A) measured by a semicarbazide method is preferably set to 0.3 mmol/g or less, particularly preferably in the range of 0 to 0.1 mmol/g, and most preferably substantially 0 mmol/g. In this way, the dispersion stability is improved compared with simply oxidation-modified fibers, and in particular, the dispersion stability is superior over a long period of time, independent of temperature and other factors. Further, as described above, if cellulose fibers with a total content of aldehyde and ketone groups of 0.3 mmol/g or less, as measured by a semicarbazide method, are used as cellulose fibers (A) in the inorganic material-containing composition of the present embodiment, the formation of aggregates due to long-term storage can be further suppressed.

Here, the oxidation performed in the presence of an N-oxyl compound using a cooxidant is described. The oxidation performed in the presence of an N-oxyl compound using a cooxidant is a method of oxidizing natural cellulose, such as softwood-derived kraft pulp, in the presence of an N-oxyl compound, such as 2,2,6,6-tetramethylpiperidin-1-oxyl (TEMPO), using a cooxidant.

In cellulose fibers (A) containing anionically modified cellulose, the aldehyde and ketone groups produced by the above oxidation reaction are preferably reduced by a reducing agent. As a result, cellulose fibers (A) containing anionically modified cellulose can be easily obtained, and better results can be achieved as a subcutaneous or submucosal expansion agent. In addition, from such a viewpoint, it is more preferable that the reducing agent is sodium borohydride (NaBH$_4$).

The measurement of the total content of aldehyde and ketone groups by a semicarbazide method is performed, for example, as described below. Specifically, exactly 50 mL of a 3 g/L aqueous solution of semicarbazide hydrochloride adjusted to a pH of 5 with a phosphate buffer solution is added to a dried sample, sealed, and shaken for 2 days. Next, 10 mL of this solution is accurately collected in a 100 mL beaker, 25 mL of 5 N sulfuric acid and 5 mL of a 0.05 N potassium iodate aqueous solution are added, and the mixture is stirred for 10 minutes. Then, 10 mL of a 5% potassium iodide aqueous solution is added, and immediately titrated with a 0.1 N sodium thiosulfate solution using an automatic titrator. From the titer etc., the carbonyl group content (total content of aldehyde and ketone groups) in the sample can be determined according to the following formula (2). Semicarbazide reacts with aldehyde and ketone groups to form Schiff bases (imines), but does not react with carboxyl groups. Thus, it is considered that only the aldehyde and ketone groups can be quantified by the above measurement.

$$\text{Carbonyl group content (mmol/g)} = (D-B) \times f \times [0.125/w] \quad (2)$$

D: titer (mL) of sample
B: titer (mL) of blank test
f: factor (−) of 0.1 N sodium thiosulfate solution
w: sample amount (g)

In cellulose fibers (A) containing anionically modified cellulose, only the hydroxyl group at the C6 position of each glucose unit in the cellulose molecules on the fiber surface is selectively oxidized to an aldehyde, ketone, or carboxyl group. Whether only the hydroxyl group at the C6 position of each glucose unit on the surface of cellulose fibers (A) is selectively oxidized can be confirmed, for example, on the $^{13}$C-NMR chart. Specifically, the peak at 62 ppm, which corresponds to the C6 position of the primary hydroxyl group of the glucose unit that can be confirmed on the $^{13}$C-NMR chart of the cellulose before oxidation, disappears after the oxidation reaction, and instead a peak derived from a carboxyl group etc. (the peak at 178 ppm is derived from a carboxyl group) appears. In this way, it can be confirmed that only the hydroxyl groups at the C6 positions of the glucose unit are oxidized to carboxyl groups etc.

Further, aldehyde groups in cellulose fibers (A) containing anionically modified cellulose can be detected, for example, using a Fehling reagent. Specifically, for example, a Fehling reagent (a mixed solution of potassium sodium tartrate and sodium hydroxide, and a copper sulfate pentahydrate aqueous solution) is added to a dried sample, and the mixture is heated at 80° C. for 1 hour. When the supernatant is blue and the cellulose fiber portion is dark blue, it can be determined that no aldehyde groups are detected. When the supernatant is yellow and the cellulose fiber portion is red, it can be determined that aldehyde groups are detected.

Cellulose fibers (A) containing anionically modified cellulose can be produced, for example, by (1) an oxidation reaction step, (2) a reduction step, (3) a purification step, and (4) a dispersion step (pulverization step). Each step is sequentially described below.

(1) Oxidation Reaction Step

After natural cellulose and an N-oxyl compound are dispersed in water (dispersion medium), a cooxidant is added, and the reaction is started. During reaction, a 0.5 M sodium hydroxide aqueous solution is added dropwise to keep the pH at 10 to 11. The reaction is considered to be complete when there is no change in pH. The cooxidant refers to a substance that oxidizes the N-oxyl compound used as an oxidation catalyst, rather than a substance that directly oxidizes the hydroxyl groups of the cellulose.

The natural cellulose refers to purified cellulose isolated from cellulose biosynthesis systems, such as plants, animals, and bacterial gels. More specific examples include softwood pulp, hardwood pulp, cotton pulp such as cotton linter and cotton lint, non-wood pulp such as straw pulp and bagasse pulp, bacterial cellulose (BC), cellulose isolated from sea squirt, cellulose isolated from seaweed, and the like. These can be used singly or in combination of two or more. Preferred among these is cellulose isolated from softwood pulp, hardwood pulp, cotton pulp such as cotton linter and cotton lint, and non-wood pulp such as straw pulp and bagasse pulp; and more preferred is cellulose isolated from softwood pulp or hardwood pulp, which can be treated to increase the surface area, such as by beating, to increase the reaction efficiency and productivity. Further, it is more preferable to use cellulose stored without drying (never dry) after isolation and purification, because microfibril aggregates are easily swollen, thus increasing the reaction efficiency and reducing the number average fiber diameter after pulverization.

The dispersion medium of natural cellulose in the above reaction is water, and the natural cellulose concentration of the reaction aqueous solution is set to any concentration so that the reagent (natural cellulose) can be sufficiently diffused. The natural cellulose concentration of the reaction aqueous solution is generally about 5 mass % or less based on the mass of the reaction aqueous solution; however, the concentration can be increased by using a device with strong mechanical stirring force.

Further, examples of the N-oxyl compound include compounds having a nitroxy radical generally used as oxidation catalysts. The N-oxyl compound is preferably a water-soluble compound, more preferably a piperidine nitroxyoxy radical, and particularly preferably 2,2,6,6-tetramethylpiperidin-1-oxyl (TEMPO) or 4-acetamide-TEMPO. The amount of the N-oxyl compound added is sufficiently a catalytic amount, preferably 0.1 to 4 mmol/L, and more preferably 0.2 to 2 mmol/L.

Examples of the cooxidant include hypochlorous acid or salts thereof, halogenous acid or salts thereof, perhalogenic acid or salts thereof, hydrogen peroxide, perorganic acid, and the like. These can be used singly or in combination of two or more. Of these, alkali metal hypohalogenates, such as sodium hypochlorite and sodium hypobromite, are preferable. When such sodium hypochlorite is used, it is preferable to proceed with the reaction in the presence of an alkali metal bromide, such as sodium bromide, in terms of the reaction rate. The amount of the alkali metal bromide added is about 1 to 40 times, and preferably about 10 to 20 times, the molar amount of the N-oxyl compound.

The pH of the reaction aqueous solution is preferably maintained within the range of about 8 to 11. The temperature of the reaction aqueous solution is optional in the range of about 4 to 40° C.; however, the reaction can be carried out at room temperature (25° C.), and temperature control is generally not required. In order to achieve a desired carboxyl group content etc., the degree of oxidation may be controlled by the amount of the cooxidant added and the reaction time. The reaction time is generally about 5 to 120 minutes, and within up to 240 minutes.

(2) Reduction Step

In the production of cellulose fibers (A) containing anionically modified cellulose, it is preferable to further perform a reduction reaction after the oxidation reaction. Specifically, the oxidized cellulose after the oxidation reaction is dispersed in purified water, and the pH of the aqueous dispersion is adjusted to about 10 using a sodium hydroxide aqueous solution or the like. The reduction reaction is performed using various reducing agents, thereby obtaining reactant fibers in which aldehyde and ketone groups are reduced. As the reducing agent used in the present embodiment, general reducing agents can be used. $LiBH_4$, $NaBH_3CN$, $NaBH_4$, and the like are preferred. Of these, $NaBH_4$ is preferred, in terms of the cost and availability.

The amount of the reducing agent added is preferably within the range of 0.1 to 4 mass %, and particularly preferably within the range of 1 to 3 mass %, based on the mass of the oxidized cellulose. The reaction temperature is generally room temperature or a temperature slightly higher than room temperature. Further, the reaction time is generally 10 minutes to 10 hours, and preferably 30 minutes to 2 hours.

After the reaction is complete, the pH of the reaction mixture is adjusted to about 2 using various acids, such as a hydrochloric acid aqueous solution, and solid-liquid separation is performed with a centrifuge while sprinkling purified water, thereby obtaining cake-like reactant fibers. The solid-liquid separation is performed until the electrical conductivity of the filtrate is 5 mS/m or less.

(3) Purification Step

Next, purification is performed for the purpose of removing the unreacted cooxidant (e.g., hypochlorous acid), various by-products, etc. Since the reactant fibers are generally not dispersed in pieces to the nanofiber unit at this stage, a general purification method, i.e., water washing and filtration, is repeated to obtain a high-purity (99 mass % or more) dispersion of the reactant fibers and water.

In the purification method in the purification step, any device can be used to achieve the above-mentioned purpose, such as a method using centrifugal dehydration (e.g. a continuous decanter). The thus-obtained aqueous dispersion of the reactant fibers in the squeezed state has a solid content (cellulose) concentration within the range of about 10 mass % to 50 mass %. In consideration of the subsequent dispersion step, a solid content concentration higher than 50 mass % is not preferable because extremely high energy is required for dispersion.

(4) Dispersion Step (Pulverization Step)

The reactant fibers impregnated with water (aqueous dispersion) obtained in the purification step are dispersed in a dispersion medium to perform dispersion treatment. The viscosity increases with the treatment, and a dispersion of the pulverized cellulose fibers can be obtained. Then, the dispersion of the cellulose fibers can be dried to obtain cellulose fibers (A) containing anionically modified cellulose. The dispersion of the cellulose fibers may be used in the dispersion state, without drying, in the subcutaneous or submucosal expansion agent.

In the expansion agent of the present embodiment, water (B), a mixed solution of water (B) and an organic solvent, or the like is used as the dispersion medium of cellulose fibers (A) containing anionically modified cellulose.

As the dispersion machine used in the dispersion step, it is preferable to use a powerful device with a high beating capacity, such as a homomixer under high-speed rotation, a high-pressure homogenizer, an ultra-high-pressure homogenizer, an ultrasonic dispersion processor, a beater, a disc refiner, a conical refiner, a double-disc refiner, or a grinder, because a more efficient and higher level of downsizing is possible, and compositions containing inorganic fine particles can be obtained in an economically advantageous manner. As the dispersion machine, it is possible to use, for example, a screw mixer, a paddle mixer, a dispersion mixer, a turbine mixer, a disperser, a propeller mixer, a kneader, a blender, a homogenizer, an ultrasonic homogenizer, a colloid mill, a pebble mill, a bead mill grinder, or the like. Two or more dispersion machines may be used in combination.

Cellulose fibers (A) containing anionically modified cellulose may be dried, if necessary. As the method for drying the dispersion of cellulose fibers (A), for example, when the dispersion medium is water, spray-drying, freeze-drying, vacuum-drying, etc. are used. When the dispersion medium is a mixed solution of water and an organic solvent, a drying method using a drum dryer, a spray-drying method using a spray dryer, etc. are used.

When cellulose fibers (A) are not dried, the water used can also be used as water (B).

Since cellulose fibers (A) have excellent transparency, the expansion agent also has excellent transparency. This makes it easier, for example, to visually confirm the submucosa to be dissected when the expansion agent is injected submucosally during ESD, and allows for safer endoscopic treatment. In addition, the high transparency is advantageous in that postoperative traces are less likely to remain when the expansion agent is injected subcutaneously in cosmetic surgery or aesthetic plastic surgery.

The concentration of cellulose fibers (A) in the expansion agent of the present embodiment is preferably within the range of 0.1 to 5 mass %, and more preferably 0.2 to 2 mass %.

When the concentration of cellulose fibers (A) is 0.1 mass % or more, sufficient expansion properties can be exhibited.

On the other hand, when the concentration of cellulose fibers (A) is 2 mass % or less, the reduction in administration properties caused by too high viscosity can be suppressed.

The concentration of water (B) in the expansion agent of the present embodiment is suitably set so that the concentration of cellulose fibers (A) is as described above.

The expansion agent of the present embodiment may contain other additives, in addition to cellulose fibers (A) and water (B).

Examples of such additives include dyes such as indigocarmine. When the expansion agent of the present embodiment contains a dye, the submucosa to be dissected during ESD is more easily visible.

Other examples of such additives include osmotic pressure regulators, including sodium chloride and sugars such as glucose. When the expansion agent of the present embodiment contains an osmotic pressure regulator, the osmotic pressure of the expansion agent can be adjusted to match the osmotic pressure of the fluid in the subcutaneous or submucosal layer.

The viscosity of the expansion agent of the present embodiment is preferably 100 to 100,000 mPa·s, and more preferably 1,000 to 50,000 mPa·s.

When the viscosity is 100 mPa·s or more, more sufficient expansion properties can be exhibited in the subcutaneous or submucosal space.

The viscosity is measured using a BM-type viscometer under conditions of 3 rpm, 20° C., and 3 minutes.

The expansion agent of the present embodiment is administered subcutaneously or submucosally by injection, and corresponds to an injection in this respect.

The expansion agent of the present embodiment may be filled in an injection at the time of use or may be pre-filled in an injection (in the form of a prefilled syringe).

Next, an example of the subcutaneous or submucosal application of the expansion agent of the present embodiment is described.

When the expansion agent of the present embodiment is applied subcutaneously, for example, the expansion agent is placed in an injection syringe, and injected subcutaneously from the injection syringe through a local injection needle with an inner diameter of about 0.35 to 0.5 mm. As a result, the expansion agent stays in the subcutaneous tissue to expand the subcutaneous tissue. This also smooths out wrinkles on the surface of the skin. In this case, the expansion agent of the present embodiment functions as a subcutaneous elevation agent.

At this time, the expansion agent of the present embodiment can be injected subcutaneously with the same force as before, and the subcutaneous tissue can be expanded larger (i.e., higher toward the skin surface) than before for a long period of time.

When the expansion agent of the present embodiment is applied to the mucosa, for example, the expansion agent is placed in an injection syringe, and injected from the injection syringe through a local injection needle with an inner diameter of about 0.35 to 0.5 mm into the mucosa of the gastrointestinal tract where a polyp is formed, for example, in the submucosa just below the polyp (i.e., the layer directly above the muscle layer, which is the outermost layer of the wall of the gastrointestinal tract). As a result, the submucosal layer is expanded, which can cause the upper mucosal layer to elevate with the polyp. In this state, when the part where the expansion agent is injected is resected and dissected with a snare or the like, the polyp is resected. In this case, the expansion agent of the present embodiment functions as a mucosal elevation agent.

At this time, the expansion agent of the present embodiment can be injected into the submucosa with the same force as before. Moreover, the mucosa can be expanded larger (i.e., higher toward the mucosal surface) than before for a long period of time.

The expansion agent of the present embodiment can be suitably used for endoscopic surgery such as EMR and ESD, and plastic surgery such as wrinkle removal.

As described above, the subcutaneous or submucosal expansion agent of the present embodiment is injected into a subcutaneous or submucosal space to expand the subcutaneous or submucosal space, and comprises cellulose fibers (A) containing anionically modified cellulose, and water (B).

The aqueous dispersion in which cellulose fibers (A) are dispersed in water (B) has a gel-like foam with a higher viscosity than that of an aqueous solution of hyaluronic acid when the shear force is small. However, when the shear force is large, the viscosity is reduced to the same level as that of the aqueous solution of hyaluronic acid, and the fluidity is increased.

Thus, the aqueous dispersion of cellulose fibers (A) has a high viscosity and excellent thixotropic properties.

Accordingly, the expansion agent of the present embodiment has a higher viscosity than that of an expansion agent containing hyaluronic acid when injected into the subcutaneous or submucosal layer; however, when the expansion agent of the present embodiment is injected into the subcutaneous or submucosal layer through a local injection needle, the fluidity is improved due to its excellent thixotropic properties, and the required pressure is only the same as that of the expansion agent containing hyaluronic acid (less resistance). Thus, sufficient administration properties can be ensured.

Therefore, the expansion agent of the present embodiment comprising cellulose fibers (A) and water (B) not only has superior expansion properties to those of conventional agents, and maintains the expanded state for a relatively long period of time, but also ensures sufficient administration properties.

In the subcutaneous or submucosal expansion agent of the present embodiment, cellulose fibers (A) may contain a carboxyl group as an anion group.

According to this configuration, due to the presence of a carboxyl group as an anion group in cellulose fibers (A), cellulose fibers (A) can be pulverized, so that cellulose fibers (A) are more uniformly dispersed in the expansion agent. Therefore, the bias in expansion properties in the expansion agent is suppressed. The elimination of the bias in expansion properties allows for the formation of subcutaneous or submucosal bulges with a higher therapeutic effect.

In the subcutaneous or submucosal expansion agent of the present embodiment, the cellulose may be oxidized in the presence of an N-oxyl compound using a cooxidant.

According to this configuration, due to the presence of cellulose anionically modified by an oxidation method using an N-oxyl compound as a catalyst and using a cooxidant in cellulose fibers (A), cellulose fibers (A) can be pulverized, so that cellulose fibers (A) are more uniformly dispersed in the expansion agent. Therefore, the bias in expansion properties in the expansion agent is further suppressed. The elimination of the bias in expansion properties allows for the formation of subcutaneous or submucosal bulges with a much higher therapeutic effect.

In the subcutaneous or submucosal expansion agent of the present embodiment, cellulose fibers (A) may be obtained from softwood-derived kraft pulp.

According to this configuration, cellulose fibers (A) obtained from softwood-derived kraft pulp have the property of being easily pulverized. Thus, an expansion agent with a relatively high viscosity, in which cellulose fibers (A) are more uniformly dispersed, can be obtained. Therefore, the viscosity of the expansion agent can be improved, and more excellent expansion properties can be achieved.

EXAMPLES

The present invention is described in more detail below with reference to Examples; however, the present invention is not limited to the following Examples as long as the gist thereof is not exceeded. In the examples, "%" means a value based on mass, unless otherwise specified.

Example 1

Cellulose fibers used in the expansion agent of Example 1 were prepared.
Production of Cellulose Aqueous Dispersion B1
(1) Oxidation Step 0.5 g (3.2 mmol, 0.08 mmol per gram of pulp) of TEMPO and 5.0 g (48.6 mmol, 1.215 mmol per gram of pulp) of sodium bromide were dissolved in 1600 g of purified water, and cooled to 10° C. After 40 g (as dry weight) of softwood bleached kraft pulp (NBKP) (mainly composed of fibers with a fiber diameter of more than 1000 nm) was dispersed in this solution, 15.0 g (5 mmol per gram of pulp, in terms of solid content) of a 12% sodium hypochlorite aqueous solution was added, and the reaction was started. Since the pH decreased as the reaction proceeded, the pH was appropriately adjusted to 10 to 10.5 while adding a 24% sodium hydroxide aqueous solution, and the reaction was carried out for 2.0 hours to obtain oxidized cellulose.

(2) Reduction Step

After the oxidized cellulose was subjected to solid-liquid separation using a centrifuge for purification, the solid content (mass %) of the oxidized cellulose was measured by a heating moisture meter. Then, purified water was added to adjust the solid content concentration to 4%. Thereafter, the pH of the slurry was adjusted to 10 using a 24% sodium hydroxide aqueous solution. The temperature of the slurry was adjusted to 30° C., and 0.3 g (0.2 mmol/g) of $NaBH_4$ was added, followed by reaction for 2 hours, thereby obtaining reactant fibers.

(3) Purification Step

A 1 M hydrochloric acid aqueous solution was added to the reactant fibers to adjust the pH to 2, and the resultant was then filtered through a glass filter. Thereafter, washing with a sufficient amount of ion-exchanged water and filtration were performed, and the electrical conductivity of the obtained filtrate was measured. The purification step was completed when there was no change in the electrical conductivity of the filtrate by repeating water washing. In this way, water-containing reactant fibers having a solid content concentration of 20% were obtained.

(4) Dispersion Step

Appropriate amounts of water and sodium hydroxide were added to the reactant fibers to obtain 2% slurry. Using a high-pressure homogenizer, 2-pass pulverization was performed at 150 MPa to obtain cellulose aqueous dispersion B1.

The carboxyl group content of the resulting cellulose aqueous dispersion B1 measured by a method described later was 1.97 mmol/g, and the carbonyl group content was 0.10 mmol, whereas aldehyde groups were not detected. The viscosity of cellulose aqueous dispersion B1 was 65110 mPa·s. The number average fiber diameter of the cellulose fibers contained in cellulose aqueous dispersion B1 was 4 nm. As the crystal structure of the cellulose contained in the cellulose fibers, a type I crystal structure was "present."

Measurement of Carboxyl Group Content

Using cellulose aqueous dispersion B1, 60 mL of a cellulose aqueous dispersion in which 0.25 g of cellulose fibers were dispersed in water was prepared, and the pH was adjusted to about 2.5 using a 0.1 M hydrochloric acid aqueous solution. Then, a 0.05 M sodium hydroxide aqueous solution was added dropwise, and the electrical conductivity was measured. The measurement was continued until the pH reached about 11. From the amount of sodium hydroxide (V) consumed in the neutralization stage of a weak acid with a gradual change in electrical conductivity, the carboxyl group content was determined according to the following formula (1):

$$\text{Carboxyl group content (mmol/g)} = V \text{ (mL)} \times [0.05/\text{cellulose mass (g)}] \quad (1)$$

Measurement of Carbonyl Group Content (Semicarbazide Method)

About 0.2 g of a sample of dried cellulose aqueous dispersion B1 was precisely weighed. Exactly 50 mL of a 3 g/L aqueous solution of semicarbazide hydrochloride adjusted to a pH of 5 with a phosphate buffer solution were added thereto, sealed, and shaken for 2 days. Then, 10 mL of this solution was accurately collected in a 100 mL beaker, 25 mL of 5 N sulfuric acid and 5 mL of a 0.05 N potassium iodate aqueous solution were added, and the mixture was stirred for 10 minutes. Thereafter, 10 mL of a 5% potassium iodide aqueous solution was added, and immediately titrated with a 0.1 N sodium thiosulfate solution using an automatic titrator. From the titer etc., the carbonyl group content (total content of aldehyde and ketone groups) in the sample was determined according to the following formula (2):

$$\text{Carbonyl group content (mmol/g)} = (D-B) \times f \times [0.125/w] \quad (2)$$

D: titer (mL) of sample
B: titer (mL) of blank test
f: factor (−) of 0.1 N sodium thiosulfate solution
w: sample amount (g)

Detection of Aldehyde Group 0.4 g of the cellulose fibers in cellulose aqueous dispersion B1 were precisely weighed, a Fehling reagent (5 mL of a mixed solution of potassium sodium tartrate and sodium hydroxide, and 5 mL of a copper sulfate pentahydrate aqueous solution) prepared according to the Japanese Pharmacopoeia was added thereto, and the mixture was heated at 80° C. for 1 hour. When the supernatant was blue and the cellulose fiber portion was dark blue, it was determined that no aldehyde groups were detected, which was evaluated as "none." When the supernatant was yellow and the cellulose fiber portion was red, it was determined that aldehyde groups were detected, which was evaluated as "present."

Number Average Fiber Diameter

The number average fiber diameter of the cellulose fibers in cellulose aqueous dispersion B1 was observed using a transmission electron microscope (TEM) (produced by JEOL Ltd., JEM-1400). Specifically, a TEM image (magnification: 10000×) obtained by casting the cellulose fibers on a hydrophilized carbon film-coated grid, and negatively staining them with a 2% uranyl acetate aqueous solution was used to determine the number average fiber diameter according to the method described above.

Crystal Structure

Using an X-ray diffractometer (produced by Rigaku Corporation, RINT-Ultima3), the diffraction profile of the cellulose fibers was measured. When typical peaks were detected at two positions around 2θ=14 to 17° and 2θ=22 to 23°, it was evaluated that a crystal structure (I-type crystal structure) was "present." When no peak was detected, it was evaluated as "none."

Further, regarding cellulose aqueous dispersion B1, whether only the hydroxyl groups at the C6 positions of the glucose units on the cellulose fiber surface were selectively oxidized to carboxyl groups or the like was confirmed on the $^{13}$C-NMR chart. As a result, the peak at 62 ppm corresponding to the C6 position of the primary hydroxyl group of the glucose unit, which could be confirmed on the $^{13}$C-NMR chart of the cellulose before oxidation, disappeared after the oxidation reaction, and instead a peak derived from a carboxyl group was observed at 178 ppm. This confirmed that in cellulose aqueous dispersion B1, only the C6-position hydroxyl groups of the glucose units were oxidized to aldehyde groups or the like.

Preparation of Expansion Agent of Example 1

As cellulose aqueous dispersion B1 produced as described above, the commercially available product name Rheocrysta (registered trademark, produced by DKS Co. Ltd., cellulose fiber concentration: 2.0 mass %) was diluted to a cellulose fiber concentration of 0.4 mass %. The resultant was used as the expansion agent of Example 1.

Expansion Agent of Comparative Example 1

Japanese Pharmacopoeia physiological saline (injection), which was a 0.9% (g/mL) aqueous solution of sodium chloride, was used as the expansion agent of Comparative Example 1.

Expansion Agent of Comparative Example 2

MucoUp (trade name, produced by Seikagaku Corporation), which was a 0.4% (g/mL) aqueous solution of sodium hyaluronate, was used as the expansion agent of Comparative Example 2.

Evaluation

The viscosity of the expansion agents of Example 1 and Comparative Examples 1 and 2 was measured according to the following method, and their passage through injection needles was evaluated. Further, the mucosal elevation properties were evaluated using the expansion agents of Example 1 and Comparative Examples 1 and 2 according to the following method.

Measurement of Viscosity

The viscosity of the expansion agents of Example 1 and Comparative Examples 1 and 2 was measured using a BM-type viscometer under conditions of 3 rpm, 20° C., and 3 minutes. The results are shown in Table 1.

TABLE 1

|  | Viscosity (mPa · s) |
| --- | --- |
| Example 1 (cellulose fiber aqueous dispersion) | 19800 |
| Comparative Example 1 (physiological saline) | 1 |
| Comparative Example 2 (MucoUp) | 60 |

Continuous Viscosity Measurement in Different Shear Rate Regions

Using a rheometer with a cone-plate-type jig, the viscosity in the high-shear region (6,000 $S^{-1}$) was measured at 20° C. for 2 minutes. Then, the shear rate was changed to 0.01 $S^{-1}$, and the viscosity in the low-shear region was measured for another 2 minutes. Table 2 shows the viscosity at each shear rate.

TABLE 2

|  | Viscosity (mPa · s) | |
| --- | --- | --- |
|  | 6,000 $S^{-1}$ | 0.01 $S^{-1}$ |
| Example 1 (cellulose fiber aqueous dispersion) | 9.3 | 55,000 |
| Comparative Example 1 (physiological saline) | 1.0 | 1.0 |
| Comparative Example 2 (MucoUp) | 10.0 | 53.6 |

Evaluation of Passage Through Injection Needle

Using a local injection catheter (Top Endoscopic Puncture Needle Super Grip (registered trademark), produced by Top Corporation) connected to a 10-mL injection syringe (Terumo Syringe (registered trademark), produced by Terumo Corporation) at one end, and equipped with a 25 G (inner diameter: 0.25 mm) endoscopic puncture needle (injection needle) at the other end, the injection syringe was filled with 10 mL of each of the expansion agents of Example 1 and Comparative Examples 1 and 2, and their passage through the puncture needle was evaluated by pushing it out of the puncture needle. In the evaluation, a numerical rating scale (NRS) was used as an evaluation scale. A score of "0" indicated that the expansion agent could be pushed out by a tester without resistance, and a score of "100" indicated that the expansion agent could not be pushed out at all. A numerical value (NRS) was used to indicate to which score out of 0 to 100 the state corresponded. The evaluation was performed by a total of 10 testers (5 randomly selected adult men and 5 randomly selected adult women) in a blinded fashion.

Then, the average NRS values of the 10 testers was compared between the expansion agents.

Figure 1:
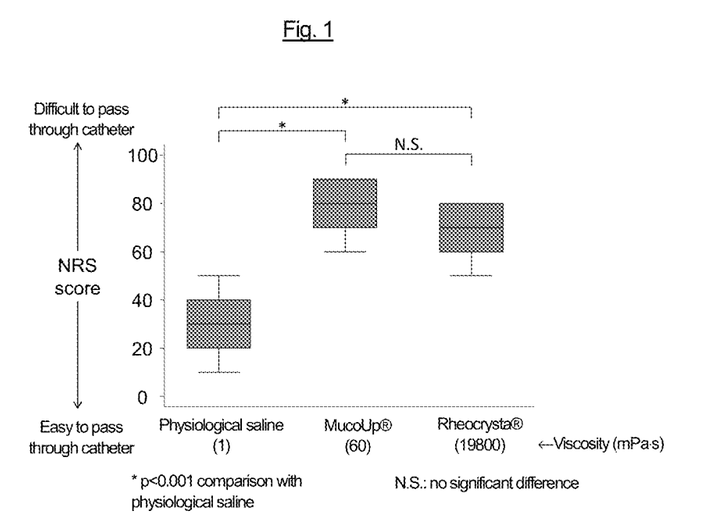
FIG. 1 is a view showing the evaluation of the passage of each expansion agent through an injection needle.

The results are shown in FIG. 1.

Evaluation of Mucosal Elevation Properties

As a subject for intramucosal injection, a porcine resected gastric section cut to about 3×3 cm was used.

A 2.5-mL injection syringe (Terumo Syringe (registered trademark), produced by Terumo Corporation) equipped with a 23 G (inner diameter: 0.35 mm) injection needle (Terumo Cattelan Needle (registered trademark), produced by Terumo Corporation) was filled with 2.5 mL of each of the expansion agents of Example 1 and Comparative Examples 1 and 2. The injection needle was inserted horizontally into the submucosa from the limbus of the cut end of the porcine resected gastric section, and 2 mL of each expansion agent was injected near the center.

Immediately after the injection of each expansion agent, the injected porcine resected gastric section and a digital camera were fixed to the stage so that the shooting distance and angle (parallel to the stage) were constant. In this state, shooting was performed every 5 minutes, and the elevated height of the mucosa (mucosal elevation height) was measured from the obtained images at each time point.

Figure 2:
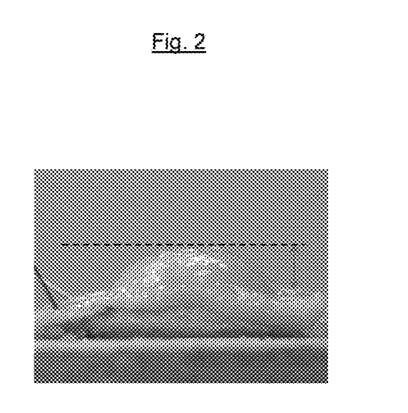
FIG. 2 is a photographic image showing the mucosal elevation height.

The mucosal elevation height was defined as the height from the mucosal surface in the area where no expansion agent was injected, to the apex of the elevation (the highest point), as shown in FIG. 2.

Figure 3:
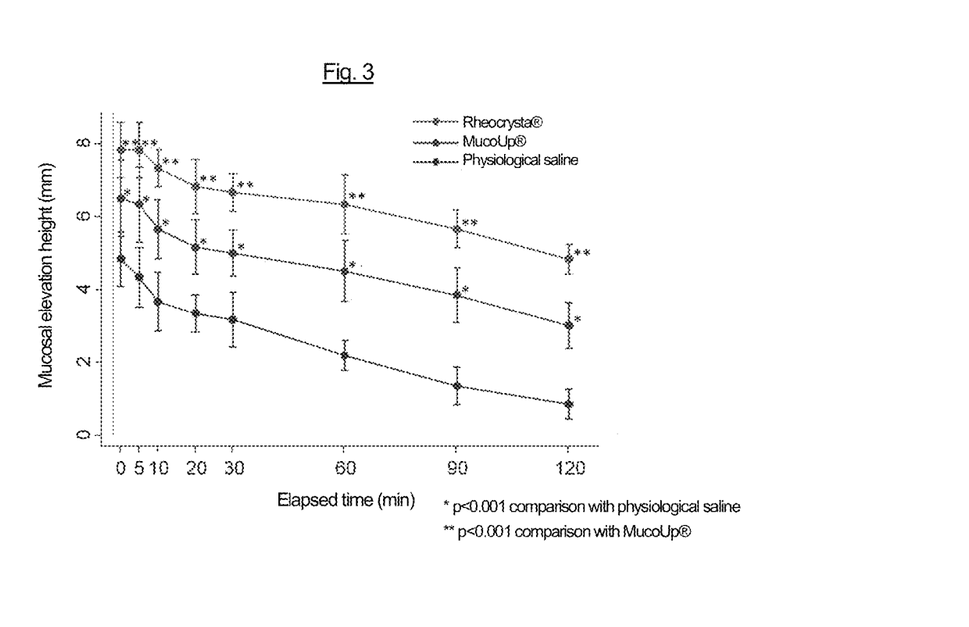
FIG. 3 is a view showing the relationship between the time elapsed after injection of each expansion agent and the mucosal elevation height.
Figure 4:
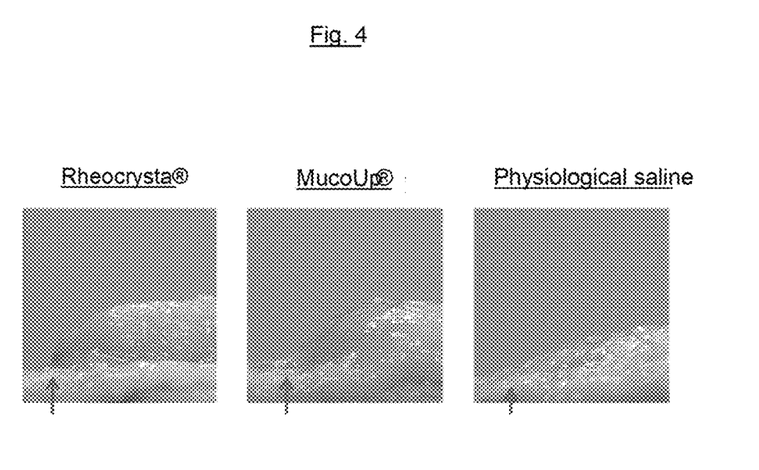
FIG. 4 shows photographic images of the mucosa immediately after the injection of each expansion agent.

This procedure was repeated 6 times for each expansion agent (n=6), and the average values of mucosal elevation height were compared between the expansion agents immediately after injection, and 5, 10, 20, 30, 60, 90, and 120 minutes after injection. The results are shown in FIG. 3. Further, the images taken immediately after injection of each expansion agent are shown in FIG. 4.

The arrow in FIG. 2 indicates the mucosal elevation height. In FIG. 4, each arrow indicates the rising position of the mucosal elevation.

As shown in Table 1, the expansion agent of Example 1 had a much higher viscosity than the expansion agents of Comparative Examples 1 and 2.

As shown in Table 2, the expansion agent of Example 1 showed a similar level of viscosity to Comparative Example 2 in the high-shear region, while showing, in the low-shear region, a viscosity about 1000 times higher than that of Comparative Example 2. From this, the expansion agent of Example 1 has a low viscosity in the high-shear region for submucosal injection etc., and can be injected without resistance. Further, the viscosity becomes very high in the low-shear region, for example, when standing still after injection; thus, this expansion agent is presumed to have high expansion properties.

As shown in FIG. 2, the passage of the expansion agent of Example 1 through the endoscopic puncture needle was slightly superior to the expansion agent of Comparative Example 2, although there was no statistically significant difference.

As shown in FIG. 3, the mucosal elevation height by the expansion agent of Example 1 was significantly higher than the expansion agents of Comparative Examples 1 and 2. Further, this high mucosal elevation height was maintained for a long period of time.

As shown in FIG. 4, the rise of the mucosal elevation by the expansion agent of Example 1 was sharper and very steeper than the expansion agents of Comparative Examples 1 and 2.

It is fully presumed that the same tendency will be obtained not only in the case of submucosal injection, but also in the case of subcutaneous injection.

The above results demonstrated that the expansion agent of Example 1 not only has superior expansion properties to those of the expansion agents of Comparative Examples 1 and 2, but also sufficiently ensures administration properties.

The invention claimed is:

1. A subcutaneous or submucosal expansion agent that is suitable for injection into a subcutaneous or submucosal space to expand the subcutaneous or submucosal space, the subcutaneous or submucosal expansion agent comprising:
   cellulose fibers (A) containing anionically modified cellulose, and
   water (B),
   wherein a number average fiber diameter of cellulose fibers (A) is within the range of 3 to 80 nm,
   wherein cellulose fibers (A) containing a carboxyl group as an anion group,
   wherein the carboxyl group content of cellulose fibers (A) is within the range of 1.2 to 2.5 mmol/g,
   wherein a measured total content of aldehyde and ketone groups of cellulose fibers (A) is 0.3 mmol/g or less, and
   wherein the viscosity of the expansion agent is 1,000 to 50,000 mPa·s.

2. The subcutaneous or submucosal expansion agent according to claim 1, wherein the cellulose is oxidized in the presence of an N-oxyl compound using a cooxidant.

3. The subcutaneous or submucosal expansion agent according to claim 1, wherein cellulose fibers (A) are obtained from softwood-derived kraft pulp.

4. The subcutaneous or submucosal expansion agent according to claim 2, wherein cellulose fibers (A) are obtained from softwood-derived kraft pulp.

5. The subcutaneous or submucosal expansion agent according to claim 3, wherein cellulose fibers (A) are obtained from softwood-derived kraft pulp.

6. A method for expanding a subcutaneous or submucosal space in a subject in need thereof comprising:
   injecting a subcutaneous or submucosal expansion agent of claim 1 into the subcutaneous or submucosal space.

7. The method for expanding a subcutaneous or submucosal space according to claim 6, wherein the subcutaneous or submucosal expansion agent is injected subcutaneously.

8. The method for expanding a subcutaneous or submucosal space according to claim 6, wherein the subcutaneous or submucosal expansion agent is injected into the mucosa of the gastrointestinal tract.

9. The method for expanding a subcutaneous or submucosal space according to claim 6, wherein the subcutaneous or submucosal expansion agent is injected during an endoscopic surgery procedure.

10. The method for expanding a subcutaneous or submucosal space according to claim 6, wherein the subcutaneous or submucosal expansion agent is injected during plastic surgery.

* * * * *